United States Patent
Padiyar

(10) Patent No.: US 8,248,038 B2
(45) Date of Patent: Aug. 21, 2012

(54) SYNCHRONOUS GENERATOR PROTECTION

(75) Inventor: K. R. Padiyar, Bangalore (IN)

(73) Assignee: Empire Technology Development LLC, Wilmington, DE (US)

( * ) Notice: Subject to any disclaimer, the term of this patent is extended or adjusted under 35 U.S.C. 154(b) by 573 days.

(21) Appl. No.: 12/550,197

(22) Filed: Aug. 28, 2009

(65) Prior Publication Data

US 2010/0301814 A1    Dec. 2, 2010

(30) Foreign Application Priority Data

May 27, 2009 (IN) .............................. 1229/CHE/2009

(51) Int. Cl.
*H02P 11/00* (2006.01)
*H02P 9/00* (2006.01)
(52) U.S. Cl. ....................................................... 322/20
(58) Field of Classification Search .................... 322/44, 322/98, 24, 20, 28; 363/39, 37
See application file for complete search history.

(56) References Cited

U.S. PATENT DOCUMENTS

| | | | | |
|---|---|---|---|---|
| 3,465,235 A | * | 9/1969 | Martin et al. | 322/24 |
| 3,529,174 A | * | 9/1970 | Smith | 307/43 |
| 4,400,659 A | * | 8/1983 | Barron et al. | 322/32 |
| 4,665,474 A | * | 5/1987 | Neupauer | 363/35 |
| 5,300,876 A | * | 4/1994 | Takagi | 322/58 |
| 5,604,420 A | | 2/1997 | Nambu | |
| 5,698,968 A | * | 12/1997 | Takagi et al. | 322/58 |
| 5,909,105 A | * | 6/1999 | Noroozian | 323/211 |
| 6,337,561 B1 | * | 1/2002 | Sudou et al. | 322/19 |
| 7,202,637 B2 | * | 4/2007 | Green et al. | 322/7 |
| 7,304,400 B2 | | 12/2007 | Kang et al. | |
| 2007/0121354 A1 | | 5/2007 | Jones et al. | |

OTHER PUBLICATIONS

International Search Report and Written Opinion issued by the Australian Patent Office in PCT/IB2010/001238, dated Nov. 3, 2010.

* cited by examiner

*Primary Examiner* — Julio Gonzalez

(74) *Attorney, Agent, or Firm* — McDonnell Boehnen Hulbert & Berghoff LLP

(57) ABSTRACT

A scheme for synchronous generator protection is provided. Based on generator input and transformer output phase information, along with the energy function concept, the scheme for synchronous generator protection provides early detection of a loss of synchronism of a generator. As such, the generator with loss of synchronism can be tripped before the generator actually slips. An example for how such a synchronous generator protection schemes may function, is also provided.

20 Claims, 6 Drawing Sheets

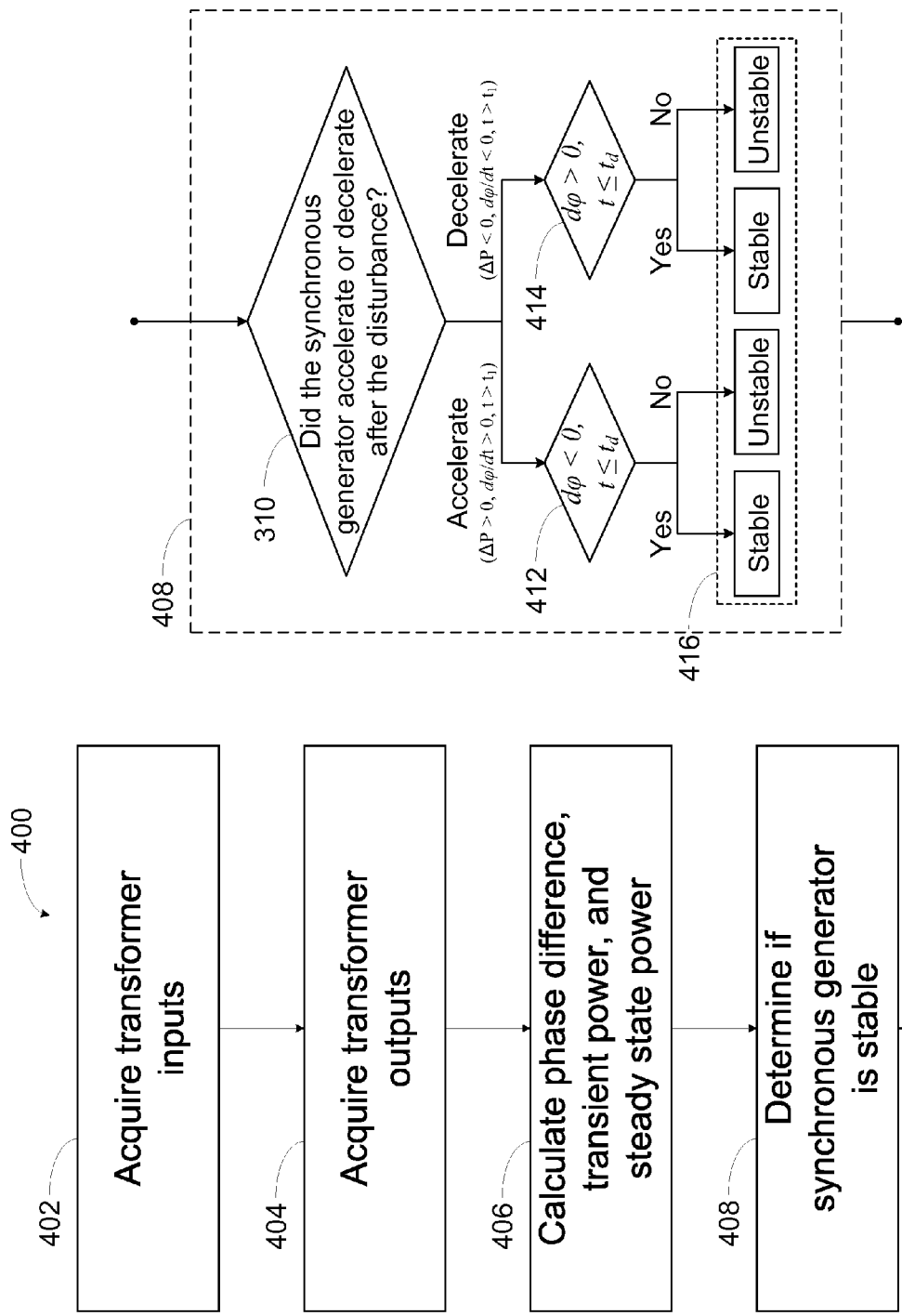

SYNCHRONOUS GENERATOR PROTECTION

CROSS-REFERENCE TO RELATED APPLICATION

The present application claims priority under 35 U.S.C. §119(d) to a corresponding patent application filed in India and having application number 1229/CHE/2009, filed on May 27, 2009, the entire contents of which are herein incorporated by reference.

BACKGROUND

In power transmission systems, synchronous generators are connected to transmission lines through step-up transformers and are brought up to a rated frequency and voltage by their respective turbine and excitation controls. In the steady state, the frequencies of all the generators in the system are identical and the phases of these generators are constants, thus providing constant power and reactive power outputs.

A major disturbance such as a fault in a transmission line can force one or a group of generators to lose synchronism. When one or a group of generators is forced out of synchronism by the fault, the one or group of generators must regain synchronism with the power transmission system. A generator losing synchronism may lead to high peak currents, pulsating torques, high rotor iron currents and mechanical resonances that are potentially damaging to the turbine-generator.

Sometimes the affected generators are able to regain synchronism successfully, but sometimes they fall further out of synchrony. Such a generator may need to be tripped and isolated if other actions to retain system integrity fail.

If no corrective action is taken, there can be further separation among the affected and unaffected groups of generators. Even when only one generator loses synchronism, allowing it to continue operating unsynchronized can result in serious damage to the generator due to high amplitude currents and pulsating torques. There is also risk of losing the auxiliaries of the unstable generator along with those of nearby synchronized generators.

SUMMARY

In an embodiment, a method for synchronous generator protection is provided, including the steps of acquiring a generator input containing a first phase value, acquiring a transformer output containing a voltage value and a second phase value, calculating a phase difference between the first phase value and the second phase value, a transient power value, and a steady state power value, and determining whether a synchronous generator is stable based on the phase difference, and the relationship between the transient power and steady state power values.

An embodiment may further include the step of determining if the generator accelerated in response to a disturbance to the synchronous generator.

Another embodiment may further include the step of determining if the time derivative of the phase difference is negative by the time the transient power and the steady state power are the same after a disturbance.

Yet another embodiment may further include tripping the synchronous generator if the synchronous generator is determined to be unstable.

In another embodiment, a synchronous generator system is provided, the including a generator for generating an input having an input phase value, a transformer for converting the input into a transformer output having a voltage value and a second phase value, and a subsystem for calculating a phase difference between the input phase value and the output phase, a transient power, and a steady state power, wherein the subsystem further determines if the synchronous generator system is stable based on the phase difference, and the relationship between the transient power and steady state power.

Another embodiment may include the generator, transformer, and subsystem configured for three-phase electric power transmission.

Another embodiment may include the subsystem further including a dq0 transform.

Yet another embodiment may include the subsystem further including a phase-lock-loop receiving a three-phase voltage input from the generator input and providing a reference phase output.

Another embodiment may also include the dq0 transform receiving the reference phase output from the phase-lock-loop and a three-phase current input from the generator input, and providing a direct current output and a quadrature current output.

In another embodiment, a method for synchronous generator protection is provided, including the steps of acquiring a generator input containing a three-phase input, performing a dq0 transform on a current component and a reference of the three-phase input, outputting a direct current and a quadrature current from the dq0 transform, calculating a transient power and a phase difference using the generator input, the direct current and the quadrature direct current, acquiring a steady state power by passing the transient power through a low-pass filter, and determining whether a synchronous generator is stable based on a behavior of the phase difference, and the relationship between the transient power and steady state power values.

A scheme for synchronous generator protection is provided. The difference between the generator input phase and transformer output phase is calculated to determine the phase across the generator transformer. Using the phase across the generator transformer and applying the energy function concept, a criterion for early detection of the loss of synchronism of a generator is derived. Early detection of the loss of synchronism provides an opportunity to trip the generator before significant power loss or even failure of the generator.

An example of how the scheme for synchronous generator protection is directed at three-phase electric power transmission systems, a very common type of power transmission system. In this example, a dq0 transform is used to reduce the three-phase power input signal into two scalar current values, thus reducing the complexity of power output calculations.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 4a is a flow diagram showing a scheme for the example synchronous generator protection system of FIG. 1.

FIG. 4b is a flow diagram showing steps for a stability determination scheme of the flow diagram of FIG. 4a.

DETAILED DESCRIPTION

Figure 1:
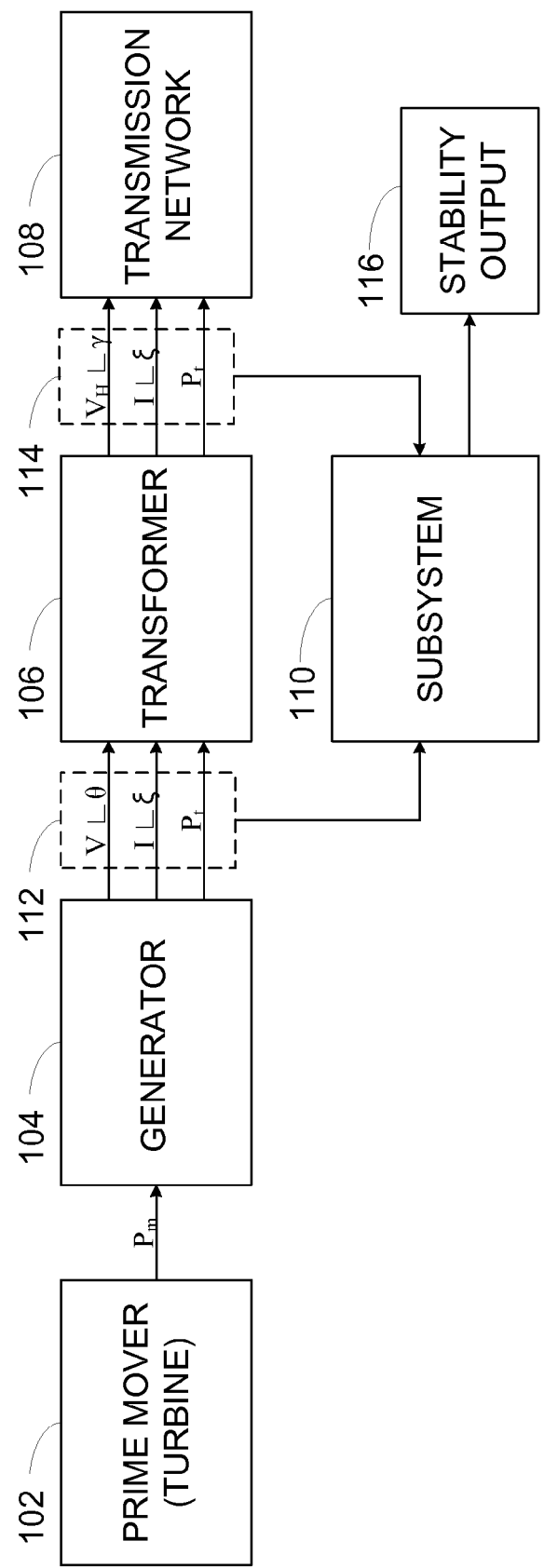
FIG. 1 is a schematic illustrating an example of a synchronous generator protection system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

FIG. 1 is a schematic of a synchronous generator system 100 having a prime mover (or turbine) 102, a generator 104, a transformer 106, a transmission network 108, a subsystem 110 and a stability output 116. The prime mover 102, generator 104, transformer 106 and subsystem 110 can be perceived as components to a local generator, while the transmission network 108 can be perceived as the inter-link between the local generator and other generators. The subsystem 110 provides a stability output 116 as discussed in the example embodiments discussed further herein. Although the disclosed embodiment is directed toward a synchronous power grid system, the principles disclosed can be applied to any system in which maintaining and recovering synchronicity is desired.

The prime mover 102 provides mechanical power $P_m$ to the generator 104. The generator 104 converts the mechanical power $P_m$ into transformer inputs 112, including the values V, θ, I∠ξ, and $P_t$. The transformer 106 receives the transformer inputs 112 and outputs transformer outputs 114, including the values $V_H$∠γ, I∠ξ, and $P_t$. As such, the transformer outputs 114 are also the output from the local generator to the transmission network 108. The subsystem 110 receives the transformer input 112 and transformer output 114, then uses the transformer inputs 112 and transformer outputs 114 to calculate the phase across the transformer φ, transient power output $P_t$, and steady state power output $P_s$ to determine if the synchronous generator is stable or unstable. The voltage and phase values inputted and outputted from the transformer vary depending on different power transmission systems and applications for which the local generator is designed.

In the embodiment of FIG. 1, the relationships of the values in the transformer inputs 112 and the transformer outputs 114 can be characterized as follows:

$$P_t = V \cdot I \cdot \cos(\theta - \xi)$$
$$= V_H \cdot I \cdot \cos(\gamma - \xi)$$
$$= \frac{V_H \cdot V}{X_t} \cdot \sin(\theta - \gamma)$$
$$= \frac{V_H \cdot V}{X_t} \cdot \sin(\varphi)$$

where $X_t$ the leakage reactance of the transformer and φ is defined as the phase across the transformer such that φ=θ−γ. As such, the voltage $V_H$ can be used to calculate the transient power output $P_t$ and steady state power output $P_s$. $P_t$ can be calculated by multiplying the voltage $V_H$ with the current I and power factor cos (γ−ξ), while the steady state power output $P_s$ can be acquired by removing the higher frequency transient components of the transient power output $P_t$. Note that in a lossless system, the steady state power $P_s$ is equal to the mechanical power $P_m$. These values, along with the phase across the generator transformer φ can be used to accurately detect the loss of synchronism of a synchronous generator. Detecting loss of synchronism with the disclosed embodiments can be implemented with little adaptation to any specific power transmission system, as it is based on fundamental concepts applicable to power systems. The criterions used for detecting loss of synchronism can be further described in more detail with reference to FIGS. 2a, 2b and 2c.

Generally, for faults occurring close to the generator, the generator typically accelerates following the disturbance, resulting in increasing transient power output $P_t$ and increasing phase across the generator φ. The ensuing behaviors of ΔP and dφ/dt can be used to determine if the generator is moving towards stability.

Figure 2A:
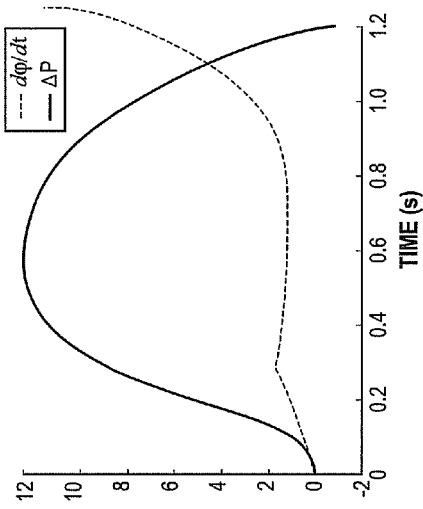
FIG. 2a is a plot showing an example of the power and phase of a generator of the example synchronous generator protection system of FIG. 1 after a disturbance.

FIG. 2a illustrates a plot of the system of FIG. 1 showing an example of a transient power component ΔP and a derivative of the phase across the transformer dφ/dt, in which the generator accelerates after a disturbance. ΔP represents the transient component of the transient power output $P_t$, which is defined as the difference between the transient power output $P_t$ and the steady state power $P_s$, such that ΔP=$P_t$−$P_s$. As shown in FIG. 2a, ΔP and dφ/dt both increase following the disturbance. If dφ/dt goes to zero (indicating φ reaching a maximum) before ΔP goes to zero (when $P_t$=$P_s$), then the generator is stable and moving towards a steady state.

Figure 2B:
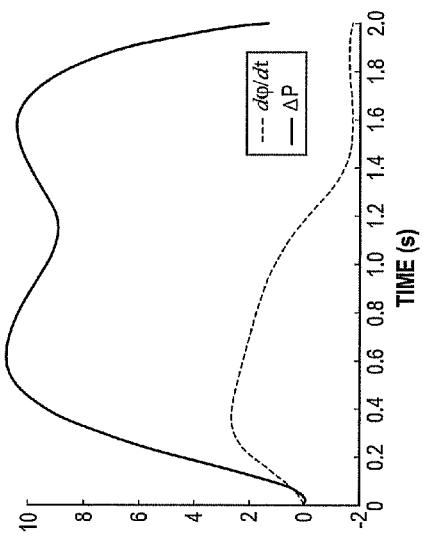
FIG. 2b is a plot showing a second example of the power and phase of a generator of the example synchronous generator protection system of FIG. 1 after a disturbance.

On the other hand, if dφ/dt does not go to zero before ΔP goes to zero, then the generator is unstable and particular actions, such as tripping the generator, may need to be taken to retain system integrity. FIG. 2b is a plot of the system of FIG. 1 showing an example of a transient power component ΔP and a derivative of the phase across the transformer dφ/dt, in which the generator accelerates after a disturbance, but does not move towards a steady state. As in FIG. 2a, ΔP and dφ/dt both increase following the disturbance. In FIG. 2b, however, dφ/dt continues to increase as ΔP moves towards zero. This is an indication of a loss of synchronism in the generator, because the phase across the transformer φ is increasing without limit, instead of returning to a steady state.

Figure 2C:
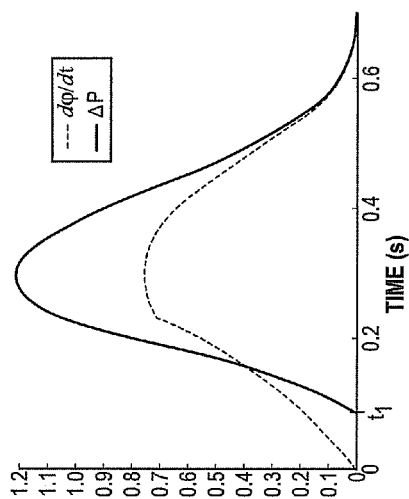
FIG. 2c is a plot showing a third example of the power and phase of a generator of the example synchronous generator protection system of FIG. 1 after a disturbance.

As faults often occur close to the generator, resulting in acceleration of the generator, deceleration can occur after the fault has been cleared and the system returns to steady state. FIG. 2c is a plot of the system of FIG. 1 showing an example of a transient power component ΔP, which is initially negative during the time t, when $0<t<t_1$, and where $t_1$ is the instant at which ΔP becomes zero. The generator accelerates during the fault and the derivative of the phase across the transformer dϕ/dt begins to increase from t=0. As ΔP increases and decreases, whether the generator is moving towards stability can be assessed by if dϕ/dt reduces to zero (indicating ϕ has reached a maximum) before ΔP goes to zero (when $P_t=P_s$). If dϕ/dt reduces zero before ΔP goes to zero, then the generator is stable and moving towards the steady state. If dϕ/dt continues to increase as ΔP goes to zero, then the generator is unstable and further action may be needed.

Though more rare, it is possible for a generator to decelerate during a disturbance due to reasons such as a high fault resistance condition. In these cases, ΔP is initially positive ($0<t<t_1$, where $t_1$ is the instant at which ΔP becomes zero) and dϕ/dt is initially negative following the disturbance and the generator accelerates after the fault is cleared. The same concepts discussed with respect to FIGS. 2a, 2b and 2c are also applicable here, such that the generator is unstable if dϕ/dt remains negative and does not reach zero before ΔP goes to zero.

Based on the reasons above, tracking the behavior of the phase across the transformer ϕ over time may determine the stability of the generator after a disturbance. Accordingly, threshold phase values ±$ϕ_t$ can be set and applied against the phase across the generator transformer ϕ such that the generator is deemed unstable once the magnitude of the phase across the generator transformer ϕ exceeds $ϕ_t$. This concept, however, can be further refined utilizing the energy function concept, resulting in a quicker and more efficient detection of loss of generator synchronism.

When applying the energy function concept, we define the kinetic energy as being proportional to the square of dϕ/dt, which is zero before the disturbance in the steady state condition. The kinetic energy here is in effect, the rotor speed, or slip. Analogously, the potential energy is defined as being proportional to ∫ΔP dϕ. In a lossless, system, the sum of the kinetic energy and potential energy is constant. Accordingly, the condition for transient stability such that the generators are operating in synchrony, is that the kinetic energy gained after a fault is converted into potential energy.

Figures 3A, 3B:
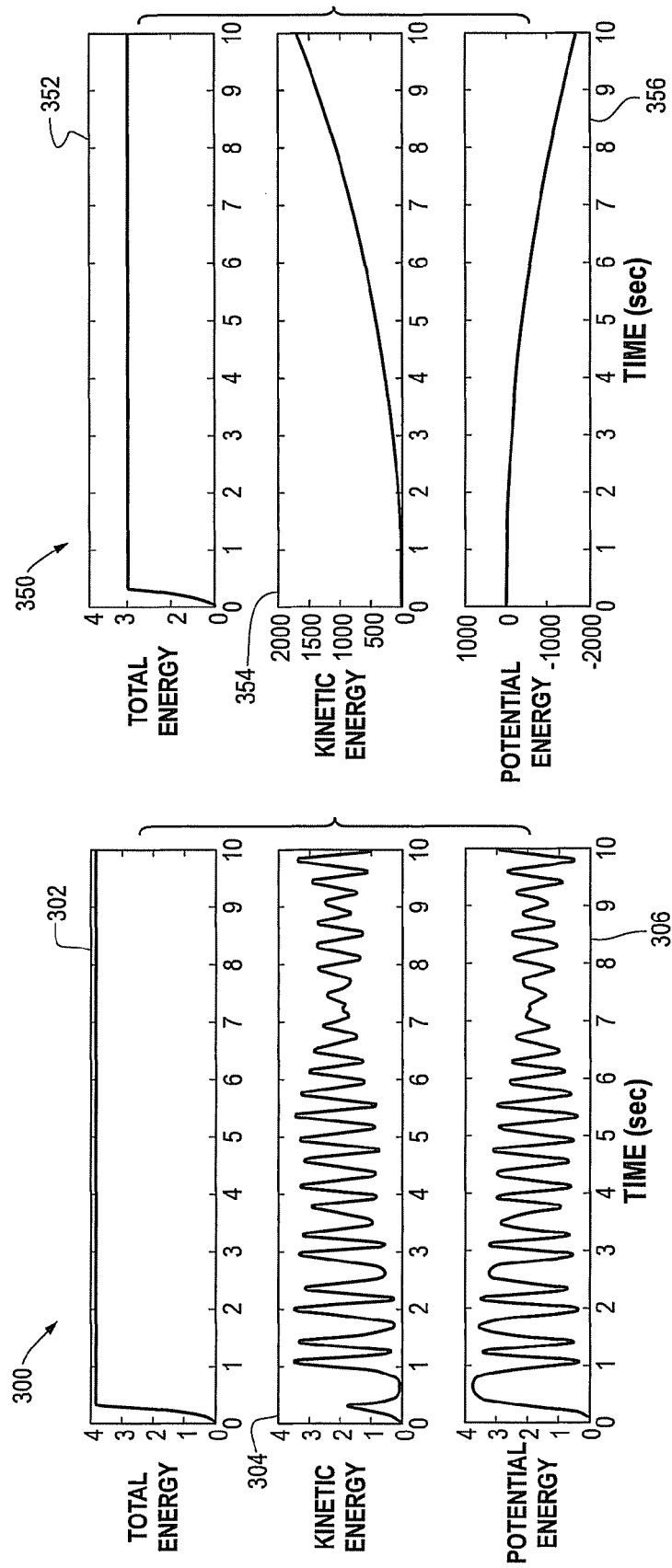
FIG. 3a is a series of plots showing the kinetic and potential energies in a stable generator system in the example synchronous generator protection system of FIG. 1.
FIG. 3b is a series of plots showing the kinetic and potential energies in an unstable generator system in the example synchronous generator protection system of FIG. 1.

FIG. 3a shows a series of plots 300 showing kinetic and potential energies in a stable generator system. A plot of total energy 302 shows the total energy in the system, starting from zero after a disturbance in the generator system and ramping up to a constant. The total energy has a kinetic energy component and a potential energy component, shown in plots 304 and 306, respectively. As shown, the kinetic energy and potential energy oscillates with respect to each other, maintaining a constant total energy. In other words, loss in kinetic energy is completely converted to potential energy, and loss in potential energy is completely converted to kinetic energy, characterizing a stable generator system.

FIG. 3b, on the other hand, shows is a series of plots 350 showing kinetic and potential energies of an unstable generator in the system of FIG. 1. A plot of total energy 352 shows the total energy in the system, similar to that of plot 302, while plot 354 shows the kinetic energy component and plot 356 shows the potential energy component, similar to plots 304 and 306, respectively. Different however, is that the kinetic energy component in plot 354 increases without limit and the potential energy component in plot 356 also decreases without limit. In this case, the kinetic energy gained after the disturbance is not converted to potential energy, characterizing an unstable system.

Referring back to FIG. 2a, dϕ/dt reaches zero before ΔP reaches zero, and is negative when ΔP reaches zero. This indicates that the kinetic energy is being converted to potential energy, and thus the generator is stable. On the other hand, FIG. 2b shows when dϕ/dt is positive when ΔP reaches zero and continues to increase beyond when ΔP reaches zero. In this case, the potential energy is decreasing while the kinetic energy is increasing, indicating that the generator is unstable, consistent with the concepts discussed above. The case shown in FIG. 2c is similar to that of FIG. 2a, but with ΔP initially negative. Accordingly, implementing a scheme based on monitoring the behavior of the dϕ/dt in relation to ΔP can provide reliable and consistent loss of generator synchronism detection within 180 degrees (or half of a slip cycle).

FIG. 4a is a flow diagram showing a scheme 400 for synchronous generator protection that can be implemented by the system of FIG. 1. This scheme 400 detects accurately the loss of synchronism of a synchronous generator by monitoring a generator transient power output $P_t$ and the phase across the generator transformer ϕ. In reference to the system shown in FIG. 1, the scheme 400 can be implemented, for example, in the subsystem 110 to determine the stability output 116.

The acquire input step 402 acquires a transformer input phase. This provides a reference point from which the phase across the generator transformer ϕ can be determined. In reference to the system shown in FIG. 1, the acquire input step 402 involves the subsystem 110 acquiring the transformer inputs 112 from the generator 104 of FIG. 1. The acquiring output step 404 acquires the transformer outputs 114 from the transformer 106 of FIG. 1.

The calculating step 406 calculates the phase across the generator transformer ϕ, the transient power output of the generator $P_t$, and a steady state power output of the generator $P_s$. The phase across the generator transformer ϕ can be calculated from the currents and voltages through the transformer and the leakage reactance of the transformer, using the mathematical equations provided above. The transient power output of the generator $P_t$ can be calculated from the current and voltage outputs from the transformer, while the steady state power output of the generator $P_s$ can be acquired through low-pass filtering of the transient power output of the generator $P_t$. While these are the methods described in this example embodiment of the present application, there may be other alternative methods for acquiring these values.

The determining step 408 determines whether the synchronous generator is becoming stable based on the behavior of the phase across the generator transformer ϕ, and the relationship between the transient power output $P_t$ and the steady state power output $P_s$ using the principles discussed herein. The further details of the determining step 408 are described below.

FIG. 4b is a flow diagram showing one example implement of the determining step 408 of FIG. 4a. The determining step 408 comprises a generator response determination step 410, a case of acceleration step 412, a case of deceleration step 414, and stability assessment output 416. Based on the phase difference ϕ, transient power output $P_t$ and steady state power output $P_s$, the generator response determination step 410 determines whether the generator accelerated or decelerated in response to a disturbance. If the generator accelerated (ΔP>0, dϕ/dt>0, $t>t_1$), the case of acceleration step 412 determines whether the time derivative of ϕ, dϕ/dt is negative before time $t_d$, defined as when ΔP is zero, or when $P_t=P_s$. If the time derivative dϕ/dt is negative before $t_d$, then the synchronous generator is determined to be stable. If not, the synchronous generator is determined to be unstable. As such, this is a method for implementing the concepts discussed above with respect to FIGS. 2a, 2b and 2c.

Analogously, if the generator decelerated ($\Delta P<0$, $d\phi/dt<0$, $t>t_1$), the case of deceleration step 414 determines whether the time derivative $d\phi/dt$ is positive before the time $t_d$, when the transient power output $P_t$ and steady state power output $P_s$ are the same. If the time derivative $d\phi/dt$ is positive before $t_d$, then the synchronous generator is determined to be stable. If not, the synchronous generator is determined to be unstable. The output of the fourth step 408 then provides the stability assessment output 416, allowing synchronous generator protection measures to be carried out accordingly. Generally, if a maximum or a minimum phase occurs before the time when the transient power output $P_t$ and steady state power output $P_s$ are the same, the synchronous generator is determined to be stable; otherwise, it is determined to be unstable.

Figure 5:
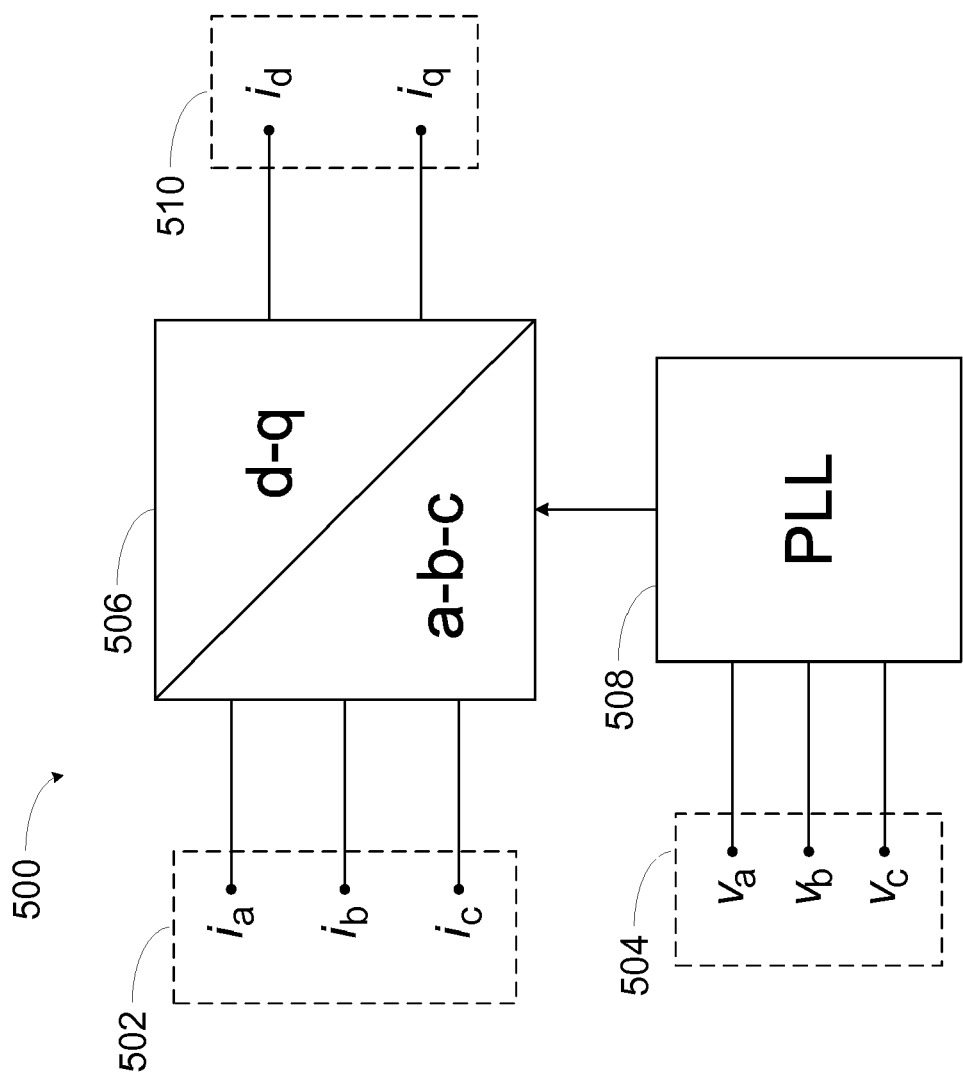
FIG. 5 is a block diagram illustrating an example of a synchronous generator protection scheme implementation of the synchronous generator protection system of FIG. 1.

FIG. 5 is a block diagram of a synchronous generator protection scheme 500 implemented to acquire the various inputs for calculating the phase across the generator $\phi$, the transient power output $P_t$, and the steady state power output $P_s$, according to a present embodiment. This scheme can be implemented in the subsystem 110 of FIG. 1 and is an example of an implementation of the calculating step 406 of FIG. 4. While this embodiment is directed towards three-phase electric power transmission systems, the concepts and principles described can be applied to any system in which mathematical manipulation of three-phase inputs is involved.

In this example, the synchronous generator scheme 500 has current inputs 502, voltage inputs 504, a dq0 transform 506, a phase-lock loop (PLL) 508, and a d-q current output 510. At the core of this synchronous generator protection scheme 500, the dq0 transform 506 is connected to the current inputs, the PLL 508, and the d-q current output 510. The PLL 508 is connected to the voltage inputs 504 the dq0 transform 506.

The current inputs 502 enter the dq0 transform 506, while the voltage inputs 504 enter the PLL 408. Both the current inputs 502 and the voltage inputs 504 are three phase electric signals coming from the generator. The PLL 508 outputs a reference generator input phase $\theta$ to the dq0 transform 506 based on phase information contained in the voltage inputs 504. With the reference generator input phase $\theta$ and the current inputs 502, the dq0 transform 506 performs a dq0 transformation and outputs the d-q current output 510. The dq0 transform 506 reduces the three-phase current inputs 502 and three-phase voltage inputs 504 to two scalar values, a direct current value $i_d$, and a quadrature current value $i_q$. The direct current value $i_d$, and the quadrature current value $i_q$ are essentially phasors of the three-phase current inputs 502, such that $\hat{i} = i_d - ji_q$.

From the direct current value $i_d$, and the quadrature current value $i_q$, the power output $P_t$ and the phase across the generator transformer $\phi$ can be calculated based on the following equations:

$$P_t = V \cdot i_d$$
$$\varphi = \tan^{-1}\left(\frac{X_t \cdot i_d}{V - X_t \cdot i_q}\right)$$

where $X_t$ is the leakage reactance of the generator transformer. The leakage reactance $x_t$ varies depending on the type of generator transformer used.

The steady state power output $P_s$ after a disturbance can be acquired by passing the power output $P_t$ through a low-pass filter. This is based on the fact that prior to the disturbance, when the generator was operating in steady state, $P_t$ was equal to $P_s$. Since $P_t$ differs from $P_s$ by transient components created by dynamics of the generator rotors during the disturbance, a suitably designed low-pass filter can produce an operable steady state power output $P_s$. In most cases, a simple first order low pass-filter would be sufficient to provide the necessary steady state power output $P_s$.

Figure 6:
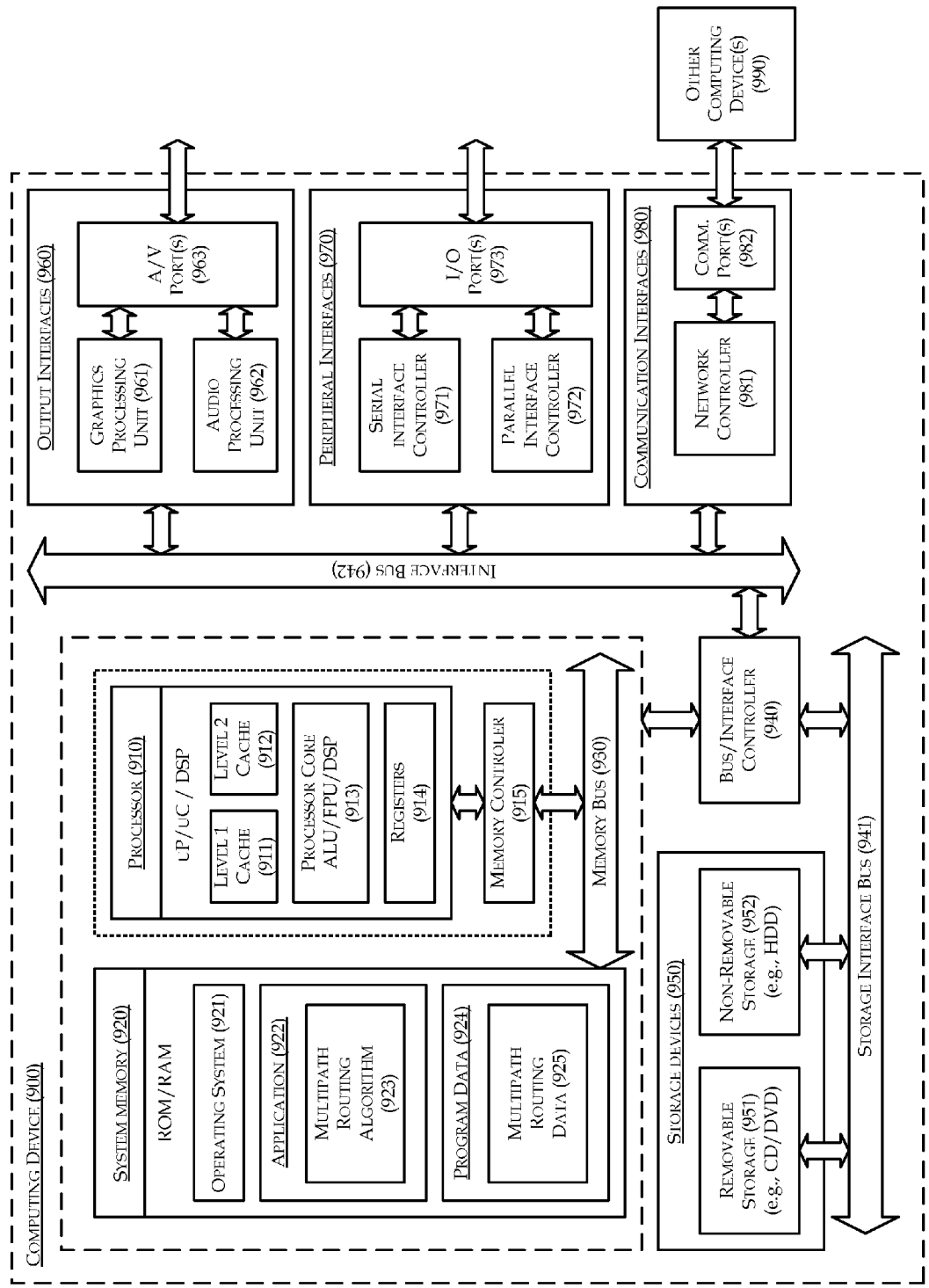
FIG. 6 is a block diagram illustrating an example computing device for synchronous generator protection system of FIG. 1.

FIG. 6 is a block diagram illustrating an example computing device 900 that is arranged for synchronous generator protection. The computing device 900 can be implemented as part of the subsystem 110 in FIG. 1. In a very basic configuration 901, computing device 900 typically includes one or more processors 910 and system memory 920. A memory bus 930 can be used for communicating between the processor 910 and the system memory 920.

Depending on the desired configuration, processor 910 can be of any type including but not limited to a microprocessor ($\mu$P), a microcontroller ($\mu$C), a digital signal processor (DSP), or any combination thereof. Processor 910 can include one more levels of caching, such as a level one cache 911 and a level two cache 912, a processor core 913, and registers 914. The processor core 913 can include an arithmetic logic unit (ALU), a floating point unit (FPU), a digital signal processing core (DSP Core), or any combination thereof. A memory controller 915 can also be used with the processor 910, or in some implementations the memory controller 915 can be an internal part of the processor 910.

Depending on the desired configuration, the system memory 920 can be of any type including but not limited to volatile memory (such as RAM), non-volatile memory (such as ROM, flash memory, etc.) or any combination thereof. System memory 920 typically includes an operating system 921, one or more applications 922, and program data 924. Application 922 includes a multipath processing algorithm 923 that is arranged to calculate the power output $P_t$, the steady state power output $P_s$, and the phase across the generator transformer $\phi$. Program Data 924 includes multipath routing data 925 that is useful for storing and processing the different inputs and outputs associated with detecting loss of synchronism in synchronous generator systems. In some example embodiments, application 922 can be arranged to operate with program data 924 on an operating system 921 such that the power output $P_t$, the steady state power output $P_s$, and the phase across the generator transformer $\phi$ can be calculated from the inputs stored in the multipath routing data 925. This described basic configuration is illustrated in FIG. 9 by those components within dashed line 901.

Computing device 900 can have additional features or functionality, and additional interfaces to facilitate communications between the basic configuration 901 and any required devices and interfaces. For example, a bus/interface controller 940 can be used to facilitate communications between the basic configuration 901 and one or more data storage devices 950 via a storage interface bus 941. The data storage devices 950 can be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of device 900.

Computing device 900 can also include an interface bus 942 for facilitating communication from various interface devices (e.g., output interfaces, peripheral interfaces, and communication interfaces) to the basic configuration 901 via the bus/interface controller 940. Example output interfaces 960 include a graphics processing unit 961 and an audio processing unit 962, which can be configured to communicate to various external devices such as a display or speakers via one or more A/V ports 963. Example peripheral interfaces 960 include a serial interface controller 971 or a parallel interface controller 972, which can be configured to communicate with external devices such as input devices (e.g., keyboard, mouse, pen, voice input device, touch input device, etc.) or other peripheral devices (e.g., printer, scanner, etc.) via one or more I/O ports 973. An example communication interface 980 includes a network controller 981, which can be arranged to facilitate communications with one or more other computing devices 990 over a network communication via one or more communication ports 982. The Communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 900 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 can also be implemented as a personal computer including both laptop computer and non-laptop computer configurations.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for synchronous generator protection, comprising:
    acquiring signals of a generator representative of a transient power output and a steady state power output, wherein the generator is coupled to a transformer;
    acquiring signals of the transformer representative of a transformer input and a transformer output, the transformer input containing a first phase value and the transformer output containing a second phase value;
    determining a phase difference between the first phase value and the second phase value; and
    determining whether the generator is stable based on whether a time derivative of the phase difference approaches zero at a time that a value of the transient power output approximately returns to a value of the steady state power output after a disturbance.

2. The method of claim 1, wherein determining whether the generator is stable further comprises determining if the generator accelerated in response to the disturbance to the generator.

3. The method of claim 2, wherein determining whether the generator is stable further comprises determining if the time derivative of the phase difference is negative at a time that the value of the transient power output approximately returns to the value of the steady state power output after the disturbance.

4. The method of claim 1, wherein determining whether the generator is stable further comprises determining if the generator decelerated in response to the disturbance to the generator.

5. The method of claim 4, wherein determining whether a generator is stable further comprises determining if the time derivative of the phase difference is positive at a time that the value of the transient power output approximately returns to the value of the steady state power output after the disturbance.

6. The method of claim 1, further comprising resetting the generator if the generator is determined to be unstable.

7. The method of claim 6, wherein determining whether the generator is stable comprises:
    determining if the generator accelerated in response to a disturbance to the generator; and
    determining if the time derivative of the phase difference is positive at a time that the value of the transient power output approximately returns to the value of the steady state power output after the disturbance.

8. The method of claim 6, wherein determining whether the generator is stable comprises:
    determining if the generator decelerated in response to a disturbance to the synchronous generator; and
    determining if the time derivative of the phase difference is negative at a time that the value of the transient power output approximately returns to the value of the steady state power output after the disturbance.

9. A synchronous generator system, comprising:
    a generator configured to generate an input having an input phase value, the generator further having a transient power output value and a steady state power output value;
    a transformer coupled to the generator and configured to convert the input from the generator into a transformer output having a voltage value and an output phase value; and
    a subsystem configured to determine a phase difference between the input phase value and the output phase value, and to determine if the synchronous generator system is stable based on whether a time derivative of the phase difference approaches zero at a time that the transient power output value approximately returns to the steady state power output value after a disturbance.

10. The synchronous generator system of claim 9, wherein the subsystem is configured to determine if the synchronous generator system is stable based on whether the generator accelerated or decelerated after the disturbance.

11. The synchronous generator system of claim 10, wherein the subsystem is configured to determine if the synchronous generator system is stable based on whether the time derivative of the phase difference is positive at a time the transient power output value approximately returns to the steady state power output value after the disturbance.

12. The synchronous generator system of claim 10, wherein the subsystem is configured to determine if the synchronous generator system is stable based on whether the time derivative of the phase difference is negative at a time the transient power output value approximately returns to the steady state power output value after the disturbance.

13. The synchronous generator system of claim 9, wherein the generator, the transformer, and the subsystem are configured for three-phase electronic power transmission.

14. The synchronous generator system of claim 9, wherein the subsystem further comprises a direct-quadrature-zero (dq0) transformer.

15. The synchronous generator system of claim 14, wherein the subsystem further comprises a phase-lock-loop configured to receive a three-phase voltage input from the generator and to provide a reference phase output.

16. The synchronous generator system of claim 15, wherein the dq0 transformer is configured to receive the reference phase output from the phase-lock-loop and a three-phase current input from the generator, and to provide a direct current output and a quadrature current output.

17. The synchronous generator system of claim 16, wherein the subsystem is configured to calculate the transient power output value using the voltage value and the direct current output.

18. The synchronous generator system of claim 16, wherein the transformer has a leakage reactance value, and wherein the subsystem is configured to calculate the phase difference using the voltage value, the leakage reactance value, the direct current output and the quadrature current output.

19. The synchronous generator system of claim 9, wherein the subsystem is configured to acquire the steady state power output value by passing the transient power output value through a low-pass filter.

20. A method for synchronous generator protection, comprising:

acquiring from a generator an input containing a three-phase input;

performing a direct-quadrature-zero (dq0) transform on a current component of the three-phase input and on a reference component of the three-phase input;

outputting a direct current and a quadrature current from the dq0 transform;

determining a transient power output value of the generator and a phase across the generator using the generator input, the direct current and the quadrature current;

acquiring a steady state power output value of the generator by passing the transient power output value through a low-pass filter; and determining whether the generator is stable based on whether a time derivative of the phase across the generator approaches zero at a time that the transient power output value approximately returns to the steady state power output value after a disturbance.

* * * * *